Patented Oct. 6, 1953

2,654,722

UNITED STATES PATENT OFFICE 2,654,722

STABILIZED SOLID ORGANIC COMPOSITIONS CONTAINING ACYL-P-AMINOPHENOLS

David W. Young, Roselle, and Delmer L. Cottle, Highland Park, N. J., assignors to Standard Oil Development Company, a corporation of Delaware No Drawing. Application September 16, 1950, Serial No. 185,326

7 Claims. (Cl. 260—31.2)

This invention relates to the stabilization of solid organic materials which tend to deteriorate in storage or in use due to undesirable oxidation reactions. In accordance with this invention, these solid organic materials, and especially rubbers, natural and synthetic, are stabilized against oxidation by incorporating therein small amounts of acyl-p-aminophenols.

Various solid organic compounds and mixtures, including resins, insecticides, soaps, waxes, hormones, vitamins, rubbers, animal and vegetable fats, etc., are adversely affected by oxygen, with the resultant formation of undesirable gums and usually discoloration of the organic compounds as well as other deleterious reactions.

It is known particularly that synthetic rubbers undergo changes due to further polymerization or degradation due to depolymerization on exposure to air and consequently yield on vulcanization inferior products unless there is incorporated therewith at time of synthesis a compound which stabilizes the synthetic rubber by largely preventing oxidation, degradation and/or cyclization of the chain molecules present in the polymer structure. Natural, as well as synthetic, rubbers require an anti-oxidant present in the vulcanizate in order that finished rubber products are stable toward oxidation and heat during their useful life.

Various p-aminophenols have been employed in the past as anti-oxidants for solid organic materials but these all suffer from the serious defects of being color unstable and discoloring to substances such as rubbers, enamels, and pigments.

Some acyl-p-aminophenols, i. e. the low molecular weight ones in which the radicals linked to the CONH group had no more than one carbon atom, e. g., acetyl-p-aminophenols have been employed in the past as stabilizers for liquid petroleum fractions, e. g., gasoline. These chemicals did not yield good results however in the liquid petroleum fractions for several reasons. Their insolubility in gasoline made the use of expensive auxiliary solvents necessary. Even with the employment of the latter the presence of acyl-p-aminophenols in the gasolines resulted in prohibitive carburetor deposition. In addition they crystallized out of the gasoline at even moderately low temperatures. Finally their lack of volatility precluded their operating efficiently in internal combustion engines.

It has now been found that acyl-p-aminophenols, wherein the acyl component has at least 3 carbon atoms, are extremely effective oxidation inhibitors and stabilizers for solid organic materials which usually degrade in the presence of air and/or heat. The resulting compositions of this invention do not suffer from any of the above-listed disadvantages of p-aminophenols, i. e., they are color stable and are not staining even in rubbers. In addition, the resulting compositions do not exhibit any of the difficulties listed above for liquid petroleum fractions.

The reason for the utility of the acyl-p-aminophenols in solid organic materials as contrasted to the liquid hydrocarbon materials is that they stay dispersed in the matrix of the solid materials such as rubbers. This is especially true of the higher molecular weight acyl-p-aminophenols which are especially unsuited for use in gasolines because of their low volatility.

The term "solid" is used in its normal and usual connotation, i. e., relatively rigid in resistance to flow and non-volatile at ordinary temperate atmospheric temperatures.

Suitable acyl-p-aminophenol compounds of the indicated type are thus illustrated in Formula I below:

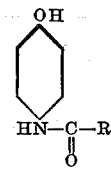

Formula I wherein R is a hydrocarbon radical having at least two carbon atoms. R can thus be an aliphatic, aromatic, alicyclic or alkaryl radical.

Those compounds wherein the R is an alkyl radical having from 7 to 17 carbon atoms are especially effective. This latter class of compounds are of particularly good color and economical to prepare. A particularly effective and desirable compound of the class of compounds of this invention is N-lauroyl-p-aminophenol.

Among the other particular compounds which may be utilized for the purpose of this invention are those in which the acyl group is derived from the following acids: butyric ($C_4$); caprylic ($C_8$); capric ($C_{10}$); lauric ($C_{12}$); myristic ($C_{14}$); palmitic ($C_{16}$); stearic ($C_{18}$); undecylenic ($C_{11}=$); oleic ($C_{18}=$); linoleic ($C_{18}==$); benzoic; cyclohexylvaleric ($C_{11}$); cyclohexylcaproic; $C_8$ oxo acids; $C_9$ oxo acid; naphthenic acids.

It should be noted particularly that many of the compounds of this invention are new chemicals. The compounds utilized for the anti-oxidant purposes of this invention are largely waterinsoluble and oil-soluble, a desirable combination of characteristics. They are mostly white waxy solids and can be employed as colorless, stable, synthetic waxes.

The compounds of this invention can be prepared in general by reacting an approximately equimolar amount of the acid anhydride or anhydrous acid in the presence of a water entraining solvent such as benzene, toluene or xylene with the aminophenol. The solid product is then dehydrated by evaporation and the product is obtained in relatively pure form. If desired, the product can be washed with water or dilute sodium carbonate solution.

A yield of over 80 mol per cent of the acyl-p-aminophenol is generally obtained. This reaction is indicated by Formula II below:

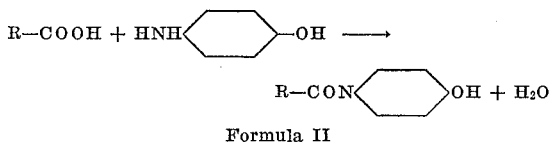

Formula II

The following examples are given to illustrate this invention and include the properties of the acyl-p-aminophenols of this invention, and test results on their use as anti-oxidants:

EXAMPLE I

Various acyl-p-aminophenols of this invention were tested for anti-oxidant effect on Paracril-26 (a butadiene-acrylonitrile synthetic rubber). Phenyl beta naphthylamine and 2,6-ditertiary butyl 4-methyl phenol were utilized as control anti-oxidants. In all cases where an anti-oxidant was employed, 1 weight per cent was incorporated in the Paracril. The results follow:

Table I
ACYL-PARA-AMINOPHENOL ANTI-OXIDANTS IN PARACRIL

[Aging conditions, 71° C. for 21 days.]

| Material Tested as Anti-oxidant | Properties of Aged Polymers | | |
|---|---|---|---|
| | Quality | Color | Percent Gel (aged) |
| None | Very poor | Black | 85 |
| Phenyl-Beta-naphthylamine | Good | do | 25 |
| 2,6-ditertiary-butyl-4-methyl-phenol | Very poor | Yellow | 85 |
| Acid Group on Amide: | | | |
| Butyryl | Good | do | 33.4 |
| Caprylic | Almost perfect a | do | 40.0 |
| Capric | do | do | 26.6 |
| Lauric | do | do | 5 |
| Myristic | do | do | 12 |
| Palmitic | do | do | 22.8 |
| Undecylenic | Good a | Brown | 11.2 | a Perfect—polymer in nearly original condition after 21 days of oven-aging.

It should be noted that the anti-oxidants of this invention were superior to conventional anti-oxidants in the necessary combination of properties, i. e., color retention and minimum gel formation.

EXAMPLE II

The acyl-p-aminophenols of this invention were tested for anti-oxidant effectiveness on a hydrocarbon product, a polyisobutylene synthetic rubber known as Vistanex. The results including control results are given below and indicate clearly the excellent anti-oxidant effect of the compounds of this invention. 0.25 weight per cent of anti-oxidant was employed where indicated. The Vistanex in the form of small pieces was held in the oven on a watch glass.

Table II
ACYL-PARA-AMINOPHENOLS IN VISTANEX

[Aging conditions—30 days at 110° C.]

| Material Tested as Anti-oxidant | Properties of Aged Polymers | | |
|---|---|---|---|
| | Quality | Color | Percent Mol. Wt. Lost |
| None | Very poor | Water white | 80. |
| Phenyl-Beta-Naphthylamine | Good | Black | 5.0. |
| 2,6-ditertiary-butyl-4-methylphenol | Very good | Yellow | 5.5. |
| Acid Group on Amide: | | | |
| Butyryl | Almost perfect | Light Yellow | 2. |
| Caprylic | do | do | 8. |
| Capric | do | do | 8. |
| Lauric | do | do | 5. |
| Myristic | do | do | 7. |
| Palmitic | do | do | 10. |
| Stearic | do | do | 15. |
| Cyclohexane Valeric | do | Yellow | Not Det. |
| Cyclohexane caproic | do | Light yellow | Do. |
| N - n - valeryl (3-pentadecyl phenol) | do | do | 8. |

EXAMPLE III

Acyl-p-aminophenols were tested for oxidation inhibiting efficiency on GR–I rubber (low unsaturation isobutylene-diolefin polymer, see U. S. 2,356,128), a copolymer of isobutylene and isoprene. This test was conducted as follows: A small piece of control raw GR–I rubber containing no inhibitor was placed in a dark air oven maintained at a temperature of 110° C. Other pieces of GR–I rubber which had admixed 0.25% of various acyl-p-aminophenols and other anti-oxidants were placed in the oven. The rubbers were held in the oven in a 60 ml. glass weighing bottle. Staudinger molecular weights were determined before and after the aging on all samples. The results follow:

Table III
ACYL-PARA-AMINOPHENOLS IN GR-I RUBBER

[Aging temperature, 110° C.]

| Material Anti-oxidant | Aging Time In Days | Properties of Aged Polymer | | |
|---|---|---|---|---|
| | | Quality | Color | Percent Mol. Wt. Lost |
| None | 3 | Poor | White | 91 |
| Phenyl-Beta-naphthylamine | 12 | Good | Brown | 19 |
| 2,6-ditertiary-4-methyl-phenol | 12 | do | Yellow | 17 |
| Acid Group on Amide: | | | | |
| Caprylic | 36 | Very Good | do | 9 |
| Lauric | 11 | do | do | 12 |
| Cyclohexane Valeric | 36 | do | do | 8 |
| Cyclohexane Caproic | 36 | do | do | 10 |
| C8 Oxo | 12 | do | do | 7 |

The results indicate that the compounds of this invention were far superior to the control anti-oxidants employed. Similar results were obtained in the testing of GR–S rubber (a copolymer of butadiene and styrene).

EXAMPLE IV

Various acyl-p-aminophenols and other anti-oxidants were tested for anti-oxidant efficacy on wax. Five one-hundredths of one per cent of the anti-oxidants were added to a 132° F. melting point wax. The samples were then held in an air oven for seventeen days at 180–190° F. At the end of the test the waxes were evaluated for taste and odor. The results are listed below:

Table IV

ACYL-PARA-AMINOPHENOLS IN HOT WAX

| Material Tested as Anti-oxidant | Properties of Wax After Test * | |
|---|---|---|
| | Taste | Odor |
| None (Blank) | 4 | 4 |
| 2,6-ditertiary-butyl-4-methylphenol | 1 | 2 |
| Acid group on Amide: | | |
| Caprylic | 2 | 2 |
| Capric | 2 | 2 |
| Lauric | 1 | 1 |
| Myristic | 0 | 0 |
| Palmitic | 0 | 0 |
| Stearic | 3 | 3 |
| Cyclohexane valeric | 0 | 1 |
| Cyclohexane caproic | 0 | 0 |

* 4=poor; 0=very good—no change. Standard odor samples used in the comparison test.

These results indicate the excellent antioxidant action of the compounds of this invention on wax. The acyl aminophenols also raise the dropping point of the wax.

EXAMPLE V

To test these anti-oxidants in cured natural rubber, the following blends were made on a rubber mill and then cured in the form of 6″ x 6″ pads for 40 minutes at 142° C. The samples were then suspended on wire in an air oven at 100° C. for 2 and 4 days. All results are recorded.

Table V

| | 1 | 2 | 3 | 4 | 5 |
|---|---|---|---|---|---|
| Smoked Sheet Natural rubber | 150 | 150 | 150 | 150 | 150 |
| Zinc oxide | 6 | 6 | 6 | 6 | 6 |
| Stearic acid | 4.5 | 4.5 | 4.5 | 4.5 | 4.5 |
| Benzothiazyl disulfide | 0.9 | 0.9 | 0.9 | 0.9 | 0.9 |
| Diortho tolyl guanidine | 0.3 | 0.3 | 0.3 | 0.3 | 0.3 |
| Sulfur | 3.75 | 3.75 | 3.75 | 3.75 | 3.75 |
| Carbon black (kosmobile 66) | 78.8 | 78.8 | 78.8 | 78.8 | 78.8 |
| Anti-oxidant | None | | | | |
| P. B. N. (Phenyl-Beta-naphthylamine) | | 1.5 | | | |
| N-Lauryl-p-aminophenol | | | 1.5 | | |
| Acetyl-para-aminophenol | | | | 1.5 | |
| N-Undecyclenic-para-aminophenol | | | | | 1.5 |
| Original Tensile (lbs./sq.inch) | 3,870 | 3,900 | 4,010 | 3,590 | 3,660 |
| Original Elongation (percent) | 490 | 510 | 520 | 490 | 520 |
| Tensile after 2 days at 100° C | 500 | 1,170 | 1,260 | 820 | 950 |
| Elongation after 2 days at 100° C | 120 | 210 | 220 | 160 | 210 |
| Tensile after 4 days at 100° C | 320 | 680 | 785 | 550 | 598 |
| Elongation after 4 days at 100° C | 70 | 130 | 160 | 100 | 140 |

The tensile and elongation values were obtained by the use of the Scott tensile tester.

It is to be noted particularly that sample No. 3 was better than sample No. 2 (that stabilized with P. B. N.) P. B. N. has always been widely used in the rubber industry but it has the great disadvantage of being light unstable, or darkening in white stocks. Also, P. B. N. is toxic. Sample No. 4 (stabilized with acetyl-para-aminophenol) is not as good as the other antioxidants evaluated due to the fact that it is not as soluble in the hydrocarbon rubber as the higher molecular weight members of the series. Acetyl-para-amino-phenol is water-soluble and its hydrocarbon solubility is very small.

EXAMPLE VI

The table below gives the physical characteristics of various members of the class of compounds utilized in this invention.

Table VI

| Organic Acid Used to Prepare N-Acyl-p-aminophenol | Properties of N-Acyl-p-aminophenols | |
|---|---|---|
| | Melting Point, ° C., Found | Color a |
| n-Butyric ($C_4$) | 129–135 | gray. |
| Caprylic ($C_8$) | 111–114 | white. |
| Capric ($C_{10}$) | 126–128 | Do. |
| Lauric ($C_{12}$) | 128 | Do. |
| Myristic ($C_{14}$) | 131–134 | Do. |
| Palmitic ($C_{16}$) | 128–129 | Do. |
| Stearic ($C_{18}$) | 132 | Do. |
| Undecylenic ($C_{11}$=) | 111–114 | tan. |
| Oleic ($C_{18}$=) | 103–105 | Do. |
| Linoleic ($C_{18}$==) | 97–99 | Do. |
| Benzoic | 210 | blue. |
| Cyclohexylvaleric ($C_{11}$) | 140–143 | light purple. |
| Cyclohexylcaproic | 133–141 | light pink. |
| $C_8$ Oxo Acids | Glass | black. |
| $C_9$ Oxo Acid | do | amber. |
| Naphthenic Acid | do | black. | a The compounds listed as colored probably can be obtained white if desired.

The compounds utilized in this invention can also be employed as mill release agents, mold lubricants, food stabilizers and processing aids for rubber resins, and such products as polyethylene, halogenated polyethylene, halogenated wax, S-polymer, halogenated natural rubber, halogenated isoprene polymers, halogenated GR–S, halogenated Vistanex, etc. They are particularly adapted for the first and last uses mentioned because of their fluffy, light character.

It is to be seen from the above examples that the compounds of this invention provide markedly effective oxidation inhibition. As a result of these tests, it is contemplated in accordance with this invention that the class of inhibitors indicated may be used generally to stabilize solid oxidation unstable, organic mixtures. The acyl-p-aminophenols are particularly adapted for use with waxes, rubbers and wax polymer blends, such as polyethylene-wax blends, etc.

The synthetic rubbers which preferably may be stabilized in accordance with this invention in addition to the GR–I and butadiene-acrylonitrile rubber are the polymers consisting predominantly of a polymerizable conjugated diolefin having four to six carbon atoms, e. g., 1,3-butadiene, isoprene, 2,3-dimethylbutadiene-1,3, 2-chlorobutadiene, piperylene, 2-methylpentadiene-1,3, and the like; hence synthetic rubbers of the above class include homo-polymers of these materials and also copolymers prepared by the polymerization of monomer mixtures comprising a major proportion of such a polymerizable diolefin and also containing a minor proportion of other mono-ethylenically unsaturated compounds copolymerizable with the diolefin such as methyl acrylonitrile, styrene, methyl methacrylate, alpha methyl styrene, vinyl naphthalene, vinyl ketones, vinylidene chloride, diethyl fumurate, and the like. Natural rubber, a homopolymer of isoprene, is also stabilized by the compounds of this invention.

The Vistanex (polyisobutylene synthetic rubber) compositions stabilized by the product of this invention have a Staudinger molecular weight of 40,000 to 300,000.

The incorporation of the acyl-p-aminophenols with the synthetic rubber may be carried out simply by adding the compound either in the solid form or in solution, suspension or emulsion to the solid synthetic rubber during the milling operation or to a latex containing the synthetic rubber dispersed in an aqueous medium such as is ordinarily obtained by an emulsion polymerization process.

The amount of the indicated acyl-p-aminophenols added to the solid, normally oxidizable organic material in order to prevent oxidation varies with different materials. In general the amount that has to be added to the solid, normally oxidizable material represents only a small proportion of the resulting compositions, i. e., 0.01–5 weight per cent in most cases.

The anti-oxidant compounds of this invention can also be employed to stabilize ester plasticized resin compositions especially the polyvinyl resins. These resin compositions contain the various vinyl resins such as polyvinyl chloride, polyvinyl acetate, polyvinyl alcohol, mixed polymers of vinyl chloride with vinyl acetate, or vinylidene chloride, polyvinyl butyral or other polyvinyl acetals; nitrocellulose, ethyl cellulose; rubberlike polymers of diolefinic materials such as butadiene-nitrile (GR-A), butadiene-styrene (GR-S) or polychloroprene elastomers, or isobutylene-diolefin copolymers of the GR-I type, or other polymeric materials customarily requiring plasticization. Mixtures of these classes of materials may be used, such as a mixture of 100 parts by weight of vinyl chloride resin with 10 to 300 parts by weight of butadiene-acrylonitrile synthetic rubber of 15 to 40% nitrile.

The esters employed in these compositions are the branched alcohol esters of aliphatic and aromatic acids including phthalic acid, sebacic acid, oleic acid, stearic acid, lauric acid, maleic acid, etc. Diisooctyl phthalate is a particularly effective plasticizer. The plasticizers are utilized usually in proportions ranging from about 5 to 100 parts or preferably 30 to 60 parts per 100 parts of resin. The acyl-p-aminophenol is added in an amount indicated above based on the total composition.

The compounds of this invention may be utilized in conjunction with other anti-oxidants in order to obtain desirable combinations of properties. Among the other anti-oxidant materials which may be so employed are phenyl-beta-naphthylamine, naphthols, substituted naphthols, substituted phenols, substituted catechols, substituted hydroquinones, alkyl phenol sulfides, ketone-amine condensation products and the like. Due to the fact that the acyl-p-aminophenols have good color, they may be mixed with 2,6-ditertiary-butyl-4-methyl phenol in rubber or resin compounds to form light colored stocks.

The anti-oxidant compounds of this invention have many advantages among which are their extreme potency, ease of preparation, good color retention, non-staining and odorless character and very low volatility.

The alkylated nuclear compounds, e. g. as disclosed in the examples, as well as the halogenated compounds also have utility. Mixtures of the compounds of this invention may also be employed to secure the desired oxidation inhibiting activity. The compounds can also be reacted with $P_2S_5$ to obtain an ashless, anti-oxidant that has detergent properties.

It is to be understood that the invention is not limited to the specific examples which have been offered merely as illustrations, since other derivatives can be prepared, and that modifications may be made without departing from the spirit of the invention.

What is claimed is:

1. A stabilized solid synthetic rubber composition comprising a synthetic rubber having admixed therewith a minor proportion effective as an anti-oxidant of an acyl-p-aminophenol, corresponding to the general formula

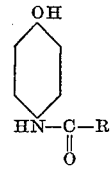

wherein R is a hydrocarbon radical having at least two carbon atoms.

2. A composition of matter as in claim 1 in which the hydrocarbon radical is an alkyl radical having from 7 to 17 carbon atoms.

3. A composition of matter as in claim 2 in which the acyl group is the lauroyl group.

4. A stabilized polyisobutylene synthetic rubber composition containing an acyl-p-aminophenol corresponding to the general formula

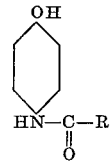

wherein R is a hydrocarbon radical having at least 2 carbon atoms, as an inhibitor against oxidative deterioration, said polyisobutylene having a Staudinger molecular weight in the range of 40,000 to 300,000.

5. A composition of matter as in claim 4, in which the hydrocarbon radical is an alkyl radical having from 7 to 17 carbon atoms.

6. A composition of matter as in claim 5, in which the acyl group is the lauroyl group.

7. A plastic composition of matter comprising a polyvinyl resin, a branched alcohol ester as a plasticizer therefor, and a minor proportion of an acyl-p-aminophenol corresponding to the general formula

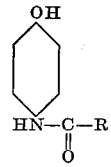

wherein R is an alkyl radical having from 7 to 17 carbon atoms.

DAVID W. YOUNG.
DELMER L. COTTLE.

References Cited in the file of this patent

UNITED STATES PATENTS

| Number | Name | Date |
|---|---|---|
| 1,938,456 | Lankelma | Dec. 5, 1933 |